United States Patent
Kim (10) Patent No.: US 9,527,399 B2
(45) Date of Patent: Dec. 27, 2016

(54) DEVICE AND METHOD FOR CONTROLLING BATTERY SOC OF HYBRID VEHICLE

(71) Applicant: Hyundai Motor Company, Seoul (KR)

(72) Inventor: Tae Soo Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 111 days.

(21) Appl. No.: 14/569,658

(22) Filed: Dec. 13, 2014

(65) Prior Publication Data

US 2016/0052420 A1 Feb. 25, 2016

(30) Foreign Application Priority Data

Aug. 25, 2014 (KR) .................. 10-2014-0110531

(51) Int. Cl.
*B60W 20/00* (2016.01)
*B60L 11/18* (2006.01)
*G01C 21/26* (2006.01)

(52) U.S. Cl.
CPC ......... *B60L 11/1862* (2013.01); *B60L 2240/12* (2013.01); *B60L 2240/423* (2013.01); *B60L 2240/54* (2013.01); *B60L 2240/642* (2013.01); *G01C 21/26* (2013.01); *Y02T 10/7005* (2013.01); *Y02T 10/7044* (2013.01); *Y02T 90/161* (2013.01); *Y02T 90/163* (2013.01); *Y02T 90/168* (2013.01); *Y04S 30/12* (2013.01)

(58) Field of Classification Search
None
See application file for complete search history.

(56) References Cited

U.S. PATENT DOCUMENTS

| 6,344,732 | B2 * | 2/2002 | Suzuki | 180/65.1 |
| 6,507,127 | B1 * | 1/2003 | Amano | B60L 11/123 290/40 A |
| 7,849,944 | B2 * | 12/2010 | DeVault | B60K 6/365 180/65.265 |
| 8,428,804 | B2 * | 4/2013 | Sakai | B60L 1/00 180/65.28 |
| 8,548,660 | B2 * | 10/2013 | Thai-Tang | B60W 10/08 700/291 |
| 8,565,952 | B2 * | 10/2013 | Mehr | B60L 11/00 180/65.265 |
| 8,600,672 | B2 * | 12/2013 | Hidaka | B60K 6/48 701/22 |

(Continued)

FOREIGN PATENT DOCUMENTS

| JP | 2001-095105 A | 4/2001 |
| JP | 2001-169408 A | 6/2001 |

(Continued)

*Primary Examiner* — Jonathan M Dager
(74) *Attorney, Agent, or Firm* — Mintz Levin Cohn Ferris Glovsky and Popeo, P.C.; Peter F. Corless (57) ABSTRACT

A device and a method for controlling a battery SOC of a hybrid vehicle that utilizes a 3D map database navigation system includes: checking a gradient condition of a road ahead and soliciting feedback from the driver as to an intended driving direction, and determining whether to control to charge or discharge a battery of the hybrid vehicle in accordance with the gradient condition of the road ahead so that the predictive energy management control of the hybrid vehicle is performed even when the driver does not set the driving route using the navigation.

11 Claims, 5 Drawing Sheets

(56) References Cited

U.S. PATENT DOCUMENTS

| | | | |
|---|---|---|---|
| 8,725,331 B2 * | 5/2014 | Yoshida | B60L 11/1842 701/22 |
| 9,067,589 B1 * | 6/2015 | Zhao | B60W 20/104 |
| 9,266,529 B2 * | 2/2016 | Dufford | B60W 20/40 |
| 9,272,712 B2 * | 3/2016 | Meyer | B60K 31/00 |
| 2002/0188387 A1 * | 12/2002 | Woestman | B60K 6/365 701/22 |
| 2008/0021628 A1 * | 1/2008 | Tryon | B60K 6/46 701/99 |
| 2008/0262668 A1 * | 10/2008 | Yamada | B60K 6/46 701/22 |
| 2008/0319596 A1 * | 12/2008 | Yamada | B60K 6/442 701/22 |
| 2008/0319597 A1 * | 12/2008 | Yamada | B60K 6/46 701/22 |
| 2009/0030568 A1 * | 1/2009 | Amano | B60K 6/445 701/22 |
| 2009/0198398 A1 * | 8/2009 | Yamada | B60K 6/46 701/22 |
| 2010/0121514 A1 * | 5/2010 | Kato | B60K 6/48 701/22 |
| 2010/0131139 A1 * | 5/2010 | Sakai | B60K 6/46 701/22 |
| 2010/0305799 A1 * | 12/2010 | Yamada | B60K 6/46 701/22 |
| 2011/0022255 A1 * | 1/2011 | Yamada | B60K 6/46 701/22 |
| 2011/0184622 A1 * | 7/2011 | Yamada | B60K 6/46 701/99 |
| 2011/0238457 A1 * | 9/2011 | Mason | G01C 21/3469 705/7.14 |
| 2012/0010767 A1 * | 1/2012 | Phillips | G01C 21/3469 701/22 |
| 2012/0035795 A1 * | 2/2012 | Yu | B60W 50/0097 701/22 |
| 2013/0006458 A1 * | 1/2013 | Bhattarai | B60W 50/082 701/22 |
| 2013/0079962 A1 * | 3/2013 | Ishikawa | B60L 15/2045 701/22 |
| 2013/0211686 A1 * | 8/2013 | Shono | B60K 6/445 701/70 |
| 2013/0226367 A1 * | 8/2013 | MacNeille | B60L 11/1862 701/1 |
| 2013/0332020 A1 * | 12/2013 | Uchihara | B60W 20/12 701/22 |
| 2014/0046595 A1 * | 2/2014 | Segawa | G01C 21/34 701/541 |
| 2014/0067246 A1 * | 3/2014 | Eldredge | B61L 3/006 701/123 |
| 2014/0195116 A1 * | 7/2014 | Hrovat | B60W 10/06 701/38 |
| 2014/0277835 A1 * | 9/2014 | Filev | G01C 21/3469 701/2 |
| 2015/0005998 A1 * | 1/2015 | Choi | B60L 11/1862 701/22 |
| 2015/0005999 A1 * | 1/2015 | Choi | F02D 29/02 701/22 |
| 2015/0039169 A1 * | 2/2015 | Dextreit | B60W 50/0097 701/22 |
| 2015/0046000 A1 * | 2/2015 | Zhao | B60K 6/445 701/22 |
| 2015/0066270 A1 * | 3/2015 | Ogawa | B60W 20/00 701/22 |
| 2015/0298680 A1 * | 10/2015 | Matthews | B60W 20/00 701/22 |
| 2016/0068151 A1 * | 3/2016 | Kim | B60W 20/106 701/22 |

FOREIGN PATENT DOCUMENTS

| | | |
|---|---|---|
| JP | 2002-354612 A | 12/2002 |
| JP | 2003-009310 A | 1/2003 |
| JP | 2003-235106 A | 8/2003 |
| JP | 2005-160269 A | 6/2005 |
| KR | 10-2008-0053561 A | 6/2008 |
| KR | 10-0949620 B1 | 3/2010 |
| KR | 10-2010-0064642 A | 6/2010 |
| KR | 10-2013-0058448 A | 6/2013 |

* cited by examiner

(RELATED ART)

ental change (for example, a gradient of the road ahead during driving), there may not be sufficient power to charge the battery due to insufficient power of the engine, and the engine operates at an inefficient driving point due to restricted electric energy usage, which may deteriorate the energy efficiency.

DEVICE AND METHOD FOR CONTROLLING BATTERY SOC OF HYBRID VEHICLE

CROSS-REFERENCE TO RELATED APPLICATION

This application claims under 35 U.S.C. §119(a) the benefit of Korean Patent Application No. 10-2014-0110531 filed on Aug. 25, 2014, the entire contents of which are incorporated herein by reference.

BACKGROUND (a) Technical Field

The present invention relates to a device and a method for controlling a battery State of Charge (SOC) of a hybrid vehicle, more particularly, to a device and a method for controlling a battery SOC in accordance with gradient information of a road ahead using the gradient information of the road ahead and a feedback from a driver.

(b) Description of the Related Art

As is widely known, when a navigation system for a vehicle including gradient (altitude) information is used to set a destination, information (i.e., information such as a gradient, a speed limit, traffic information, etc.) on a route from a current location to the destination may be provided.

In the case of a hybrid vehicle, effects on fuel efficiency by an energy management strategy including power distribution between an engine and a motor, engine on/off, management of a battery State of Charge (hereinafter, abbreviated as "SOC") are significant so that when predictive energy management is performed using information on a road ahead from the navigation system, the effect on fuel efficiency of the hybrid vehicle may be maximized.

When a driver knows a driving route to a destination, the driver frequently drives the vehicle without setting the destination using the navigation; however, when the route is not set, the predictive energy management using the front gradient information may not be appropriately performed.

For example, after charging or discharging the battery SOC, because a downhill/uphill route ahead on the road on which the vehicle is currently running is recognized, when the driver changes a driving route which is not the downhill/uphill route or even when the predictive energy management control is performed in consideration of the uphill which is followed by the downhill, the destination of the driver is after the uphill and before the downhill, the predictive energy management control is erroneously predicted without recognizing the driving intention of the driver, which may adversely affect fuel efficiency.

Among the predictive energy management control items, a battery state of charge (SOC) control strategy manages the energy by a post-response manner without considering information on the road ahead.

The post-response manner refers to a manner in which when the battery SOC is out of a predetermined range in accordance with road, traffic, and driving conditions, compensation therefor is performed.

Figure 4:
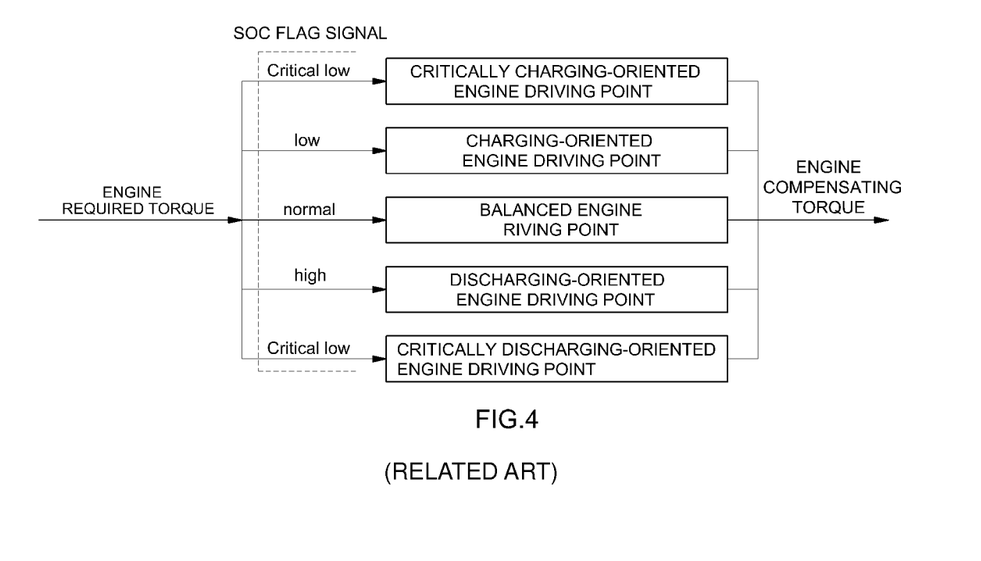
FIG. 4 (RELATED ART) is a diagram for explaining SOC control of the related art.

For example, according to the post-response manner, as illustrated in FIG. 4 (RELATED ART), when the battery SOC exceeds a set normal band (for example, 45 to 60%), a discharging-oriented strategy is selected to increase the usage of electric energy, but when the battery SOC is lowered to a low band which is below the normal band, a charging-oriented strategy is selected to increase a torque of an engine for charging the battery to return the battery SOC to the normal band.

However, when the battery SOC is lowered to the low band and a high power driving circumstance occurs in accordance with an environmental change (for example, a gradient of the road ahead during driving), there may not be sufficient power to charge the battery due to insufficient power of the engine, and the engine operates at an inefficient driving point due to restricted electric energy usage, which may deteriorate the energy efficiency.

When the battery SOC reaches a high state without recognizing a long downhill road condition ahead, the energy which may be obtained by a regenerative braking system may be wasted due to an early fully charged battery.

The above information disclosed in this Background section is only for enhancement of understanding of the background of the invention and therefore it may contain information that does not form the prior art that is already known in this country to a person of ordinary skill in the art.

SUMMARY

The present invention provides a device and a method for controlling a battery State of Charge (SOC) of a hybrid vehicle, which while driving a hybrid vehicle including a 3D map database navigation system installed therein, after the steps of checking a gradient condition of a road ahead of the vehicle and soliciting feedback to check an intended driving direction of the driver, determines whether to compensate the controlling of the battery SOC to control the battery SOC in accordance with the gradient condition so that SOC control is smoothly performed without having an error among the predictive energy management control items of the hybrid vehicle when the driver does not set the driving route using the navigation.

In one aspect, the present invention provides a device for controlling a battery SOC of a hybrid vehicle, including: a navigation which provides a driving route and gradient information within a predetermined distance ahead; a controlling determining unit which determines whether it is required to control a battery SOC based on the information provided from the navigation, a vehicle speed, and SOC information; a user interface which receives a feedback of a driving direction from a driver when it is determined that it is required to control the battery SOC; and a charging/discharging scheduler unit which sets a reference SOC trajectory by calculating an SOC amount based on the driving path and the gradient information within the predetermined distance ahead and charges/discharges the battery within the set reference SOC trajectory, when the feedback of the driving direction from the driver (i.e., feedback that is inputted by the driver to indicate the driver's intention as to the driving direction) is received.

In a preferred embodiment, the device may further include: an engine driving point determining unit which determines an engine driving point in accordance with a current battery SOC; and an engine compensating torque calculating unit which adds a compensating torque in accordance with the reference SOC trajectory to an engine output torque which is output from the engine driving point driving unit to adjust an engine driving point.

In another preferred embodiment, the user interface may include: a notifying unit which notifies to the driver that the SOC needs to be controlled in accordance with a road gradient ahead; and a feedback input unit which inputs an intended driving direction of the driver.

In still another preferred embodiment, the notifying unit may employ one or more of a cluster, a navigation, and a head-up display.

In yet another preferred embodiment, the feedback input unit may employ one or more of a soft button on the navigation, a button on a steering wheel, a paddle shift, and a voice command recognizing unit.

In another aspect, the present invention provides a method of controlling a battery SOC of a hybrid vehicle including: a controlling determining step of determining whether it is required to control charging or discharging of a battery for every battery SOC based on a driving route and gradient information within a predetermined distance ahead and a vehicle speed, and SOC information; a user interface executing step of receiving a feedback of a driving direction from a driver when it is determined that it is required to control to charge or discharge the battery; and a charging or discharging scheduling step of setting a reference SOC trajectory by calculating an SOC amount based on the driving route and the gradient information within a predetermined distance ahead when the feedback of the driving direction from the driver is received and controlling to charge or discharge the battery within the set reference SOC trajectory.

In a preferred embodiment, the controlling determining step may include: a first step of calculating predictive required power of a vehicle in accordance with the driving route and the gradient condition within the predetermined distance ahead under a predetermined vehicle speed condition; a second step of determining whether to satisfy a condition that the calculated predictive required power or an average gradient value is equal to or larger than or equal to or smaller than a predetermined limit and the current battery SOC is maintained in a predetermined band; and a step of outputting a flag for controlling to charge or discharge a battery for the charging or discharging scheduling when it is determined to satisfy the condition in the second step.

In another preferred embodiment, when there is a crossroad in the driving route within the predetermined distance ahead, the flag for controlling to charge or discharge a battery may be output after receiving the feedback of the driving route from the driver.

In still another preferred embodiment, when the current SOC of the battery is out of a predetermined band or the vehicle speed is lowered below a predetermined vehicle speed, the controlling determining step may be released.

In yet another preferred embodiment, the user interface executing step may include: notifying to the driver that the SOC needs to be controlled in accordance with a road gradient ahead; and directly inputting an intended driving direction of the driver through a feedback input unit by the driver.

In still yet another preferred embodiment, the method may further include: a step of determining an engine driving point in accordance with a current battery SOC; and an engine compensating torque calculating step of adjusting the engine driving point by adding a compensating torque in accordance with the reference SOC trajectory to an engine output torque which is output in accordance with the determined engine driving point.

Through the aforementioned technical solutions, the present invention provides the effects below.

A feedback indicating that the driver drives on a downhill or uphill route ahead or changes the route to a driving route (e.g., a flat road) in the middle of driving on the downhill or uphill road is precisely received from the driver to control to charge or discharge the battery in accordance with the driving road condition so that even when the driver does not use the navigation to set the driving route, it is possible to smoothly control to charge or discharge the battery for every battery SOC without incurring an error, among predictive energy management control items of a hybrid vehicle.

For example, the battery SOC is secured to be charging oriented in a straight course immediately before an uphill course, power performance is improved by sufficient motor assistance in the uphill course, and also the SOC in the middle of or after the uphill course may be maintained in a predetermined level.

In contrast, in a straight line course immediately before the downhill course, discharging is aimed and an increased SOC amount which may be obtained by regenerative braking system is predicted and the battery may be smoothly charged in accordance with the regenerative braking system in the downhill course.

A non-transitory computer readable medium containing program instructions executed by a controller can include: program instructions that determine whether it is required to control charging or discharging of a battery of a hybrid vehicle for every battery SOC based on a driving route and gradient information within a predetermined distance ahead and a vehicle speed, and SOC information; program instructions that receive a feedback of a driving direction from a driver when it is determined that it is required to control the charging or discharging of the battery; and program instructions that set a reference SOC trajectory by calculating an SOC amount based on the driving route and the gradient information within a predetermined distance ahead when the feedback of the driving direction from the driver is received and controlling to charge or discharge the battery within the set reference SOC trajectory.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

The present invention has been made in effort to smoothly control charging or discharging of a battery for every battery SOC without incurring an error, among predictive energy management control items of a hybrid vehicle in accordance with a gradient condition of a road ahead when a driver does not use a navigation to set a destination while driving a hybrid vehicle having a 3D map database navigation system installed therein.

Figure 1:
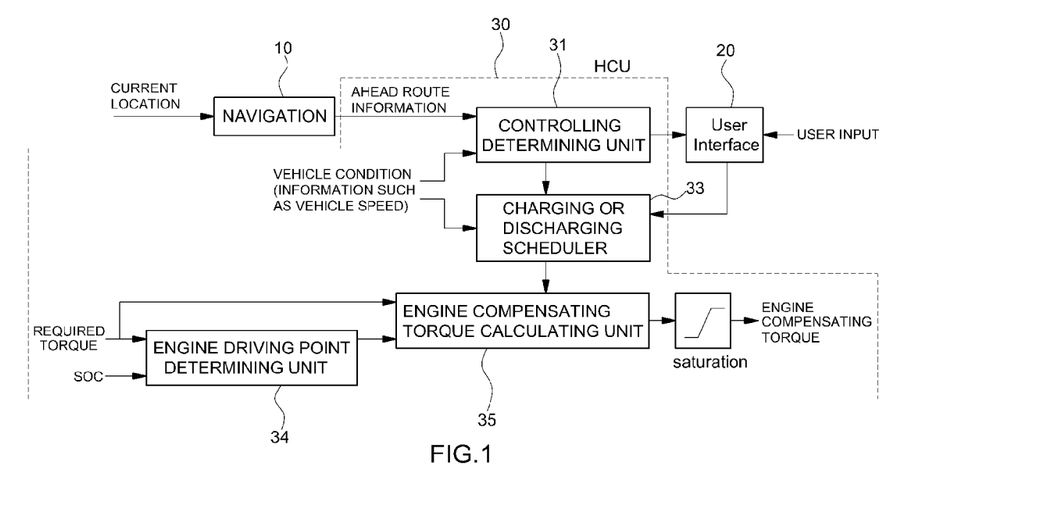
FIG. 1 is a control block diagram illustrating a device of controlling a battery SOC of a hybrid vehicle according to an exemplary embodiment of the present invention.

FIG. 1 is a control block diagram illustrating a device of controlling a battery SOC of a hybrid vehicle according to an exemplary embodiment of the present invention.

According to the present invention, a navigation system 10 provides not only a driving route within a predetermined distance ahead, but also gradient information such as a downhill road or an uphill road.

A control device according to an exemplary embodiment of the present invention includes a user interface 20 which receives feedback from a driver in order to control the battery SOC in accordance with a driving route and the gradient information when the driver does not set a destination through the navigation.

The user interface 20 includes a driver notifying unit which notifies to a driver that the battery SOC needs to be controlled in accordance with the road gradient ahead during driving and a feedback input unit which inputs an intended driving direction of the driver.

Preferably, the driver notifying unit employs one or more of a cluster, a navigation, and a head-up display which allows a user to view a signal indicating that the battery SOC is required to be controlled.

The feedback input unit may use any of input units within an operational range of the driver, for example, may include a soft button on the navigation, a button on a steering wheel, a paddle shift, or a voice command recognizing unit.

The control device according to the exemplary embodiment of the present invention includes a control unit 30 which determines whether to control the battery SOC (whether to charge or discharge the battery), based on a driving route and gradient information of the road ahead which is provided from the navigation and driving direction information provided by the driver via feedback through the user interface, to control the battery SOC in accordance with the front road condition.

More specifically, the control unit 30 includes a control determining unit 31 which determines whether to control the battery SOC based on a speed provided from the vehicle and current SOC information in addition to the driving route and the gradient information within a predetermined distance ahead provided from the navigation, and an SOC scheduler 33 which calculates an SOC amount based on the driving route and the gradient information within the predetermined distance ahead to set a reference SOC trajectory when a feedback of an intended driving direction of the driver is received and controls the battery SOC in the set reference SOC trajectory.

The control determining unit 31 calculates predictive required power for driving a vehicle in accordance with the condition of the driving route within a predetermined distance ahead, the gradient, and the speed, and outputs a flag for controlling the SOC to the SOC scheduler 33 when satisfying conditions such that the calculated predictive required power and/or an average gradient value is equal to or larger than a predetermined limit (uphill) or equal to or smaller than a predetermined limit (downhill) and the current battery SOC is in a designated band.

For example, when the predictive required power is equal to or larger than a predetermined limit, it means an uphill driving condition so that a discharge-oriented flag is output, and when the predictive required power is equal to or smaller than the predetermined limit, it means a downhill driving condition so that a charge-oriented flag is output.

In this case, when the current battery SOC during driving is out of the designated band or the speed of the vehicle is lowered below a predetermined level, it is not determined whether to control the SOC.

The SOC scheduler 33 receives a flag for controlling the SOC to charge or discharge the battery in accordance with the road gradient situation.

In the meantime, the control unit further includes an engine driving point determining unit 34 which determines an engine driving point in accordance with the current battery SOC and an engine compensating torque calculating unit 35 which adds a compensating torque in accordance with the reference SOC trajectory to an engine output torque which is output from the engine driving point determining unit to adjust the engine driving point.

For example, when the vehicle enters a downhill road, a motor assist driving is not performed in a state where a charged amount which is obtained by a regenerative braking system is calculated to predict the reference SOC trajectory so that a positive compensating torque is added to adjust the engine driving point and in contrast, when the vehicle enters an uphill road, the battery discharge is performed to perform the motor assist driving in a state where the reference SOC trajectory is set so that a negative compensating torque is added to adjust the engine driving point.

Here, a battery SOC control method for a hybrid vehicle based on the control device according to the exemplary embodiment of the present invention described above will be sequentially described below.

Figure 2:
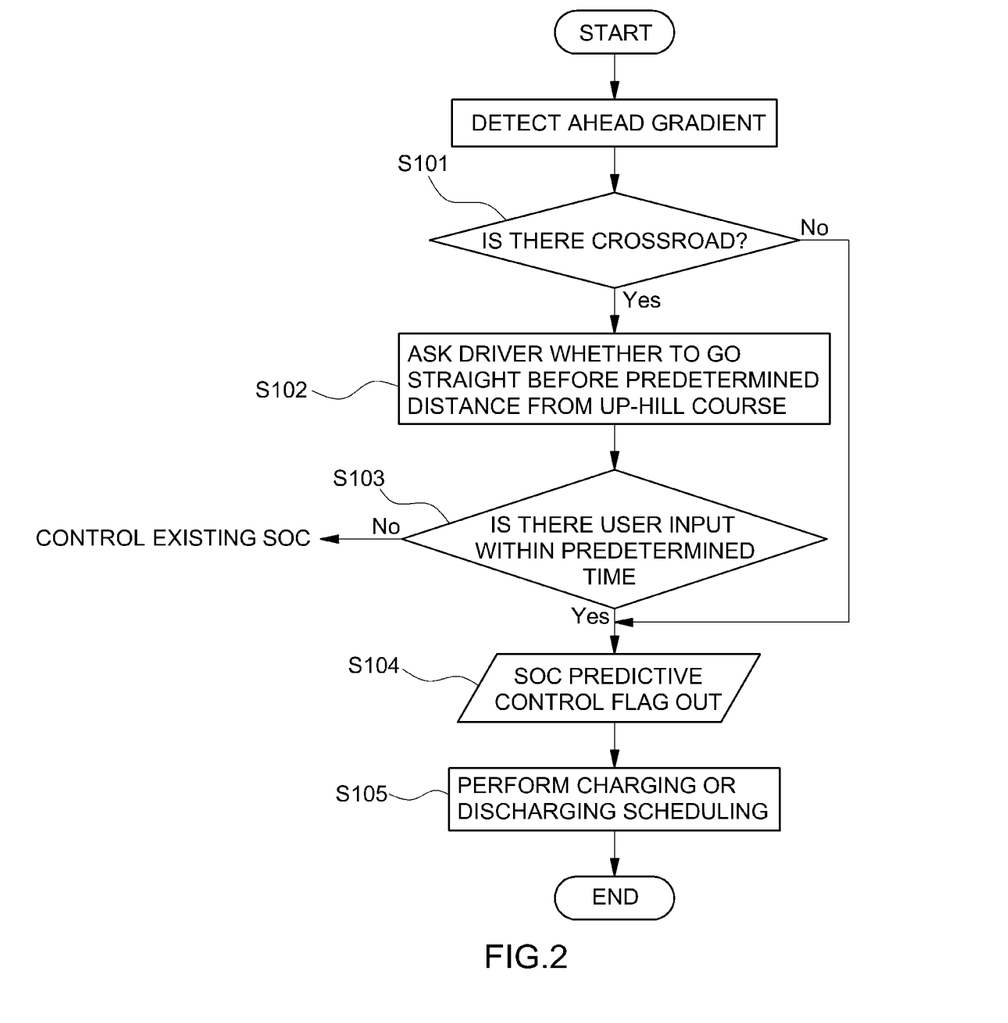
FIG. 2 is a flowchart illustrating a method of controlling a battery SOC of a hybrid vehicle according to an exemplary embodiment of the present invention.

First, in the control determining unit 31, a control determining step is performed to determine whether it is required to control charging or discharging of a battery for every battery SOC based on a speed of the vehicle and SOC information in addition to a driving route within a predetermined distance ahead and gradient information.

To this end, the navigation 10 provides gradient information of the road at the front side and a crossroad to the control determining unit 31 in step S101 and simultaneously provides a speed of the vehicle and battery SOC information from various sensors of the vehicle.

For the control determining step, first, predictive required power of a vehicle in accordance with a driving route within a predetermined distance ahead and a gradient condition is calculated under a predetermined speed condition, and it is determined to satisfy conditions such as whether the calculated predictive required power or an average gradient value is equal to or larger than or equal to or smaller than a predetermined limit and the current battery SOC is maintained within a predetermined band.

For example, when the predictive required power of the vehicle is equal to or larger than a predetermined limit or an average gradient value is equal to or larger than a predetermined limit, it means uphill driving, and when the predictive required power of the vehicle is equal to or smaller than a predetermined limit or an average gradient value is equal to or smaller than a predetermined limit, it means downhill driving. Further, it is determined whether the battery SOC is maintained within a dischargeable band in the case of uphill driving and it is determined whether the battery SOC is maintained within a chargeable band in the case of downhill driving.

As a result of determination, when it is determined that the conditions are satisfied, the control determining unit 31 finally determines that the SOC control is required to output a flag for controlling the SOC for the purpose of an SOC scheduling but after receiving a feedback on a driving direction from the driver.

Therefore, as described above, if it is determined that the battery SOC control is required, a feedback of the driving direction from the driver is received through the user interface in step S102.

For example, whether to directly drive in spite of the crossroad or drive to a crossroad which exists in a driving path within a predetermined distance at the front side is notified to the driver notifying unit (one or more of a cluster, a navigation, and a headup display) and an intended driving direction of the user is input through the feedback input unit (a soft button on the navigation, a button on a steering wheel, a paddle shift, or a voice command recognizing unit).

The flag for controlling the SOC receives the feedback of the intended driving route of the driver and then is output to the SOC scheduler 33 in step S104.

For example, when the predictive required power is equal to or larger than a predetermined limit, it means an uphill driving condition so that a discharge-oriented flag is output, but when the predictive required power is equal to or smaller than the predetermined limit, it means a downhill driving condition so that a charge-oriented flag is output.

In the meantime, when the battery SOC is out of the predetermined band (for example, the battery SOC is fully charged in the case of downhill driving) or a speed of the vehicle is reduced below a predetermined speed, or there is no feedback from the driver (S103), the control determining step is released so as not to be performed.

Next, when the SOC scheduler 33 receives the feedback of the intended driving direction of the driver and the flag for SOC control, an SOC scheduling step is performed in step S105 to set a reference SOC trajectory by calculating the battery SOC based on the driving route within a predetermined distance at the front side and the gradient information and control the battery SOC within the set reference SOC trajectory.

In this case, the reference SOC trajectory means a predictive SOC trace to smoothly charge or discharge the battery in a predetermined road gradient (downhill or uphill) course.

Figure 3A:
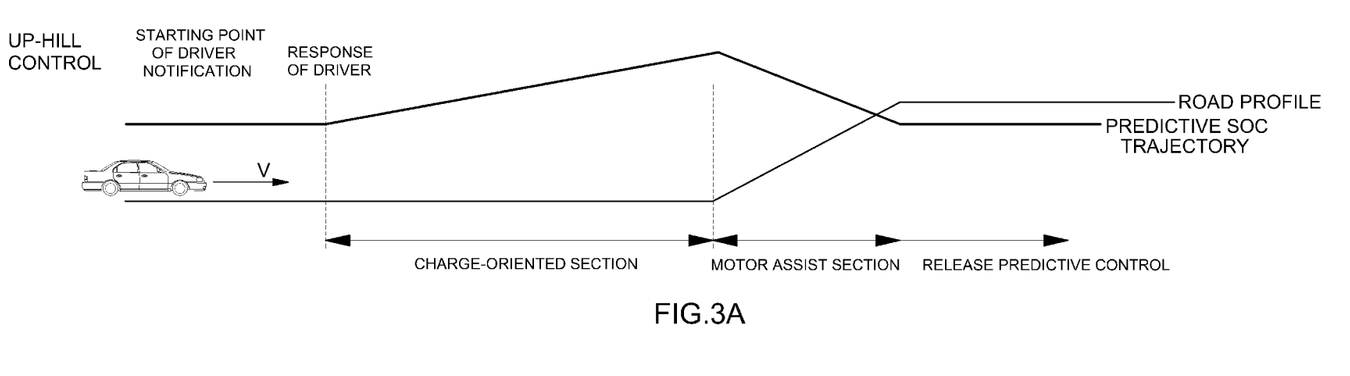
FIGS. 3A and 3B are diagrams illustrating applied examples of a method of controlling a battery SOC of a hybrid vehicle according to an exemplary embodiment of the present invention.

For example, as illustrated in FIG. 3A, when after receiving the feedback of the intended driving direction of the driver, the uphill driving is performed, the reference SOC trajectory is set by calculating a battery SOC amount in a course immediately before the uphill driving and when passing the uphill driving course and the battery is charged or discharged within the set reference SOC trajectory, but the battery is charged in a straight line course immediately before the uphill driving and the battery is discharged in the uphill driving course which requires a high power so that a motor assist driving is performed.

Therefore, when the battery SOC is lowered to a low band and an engine power is insufficient during the uphill driving, the motor assist driving is allowed by discharging the battery so that smooth uphill driving may be performed.

Figure 3B:
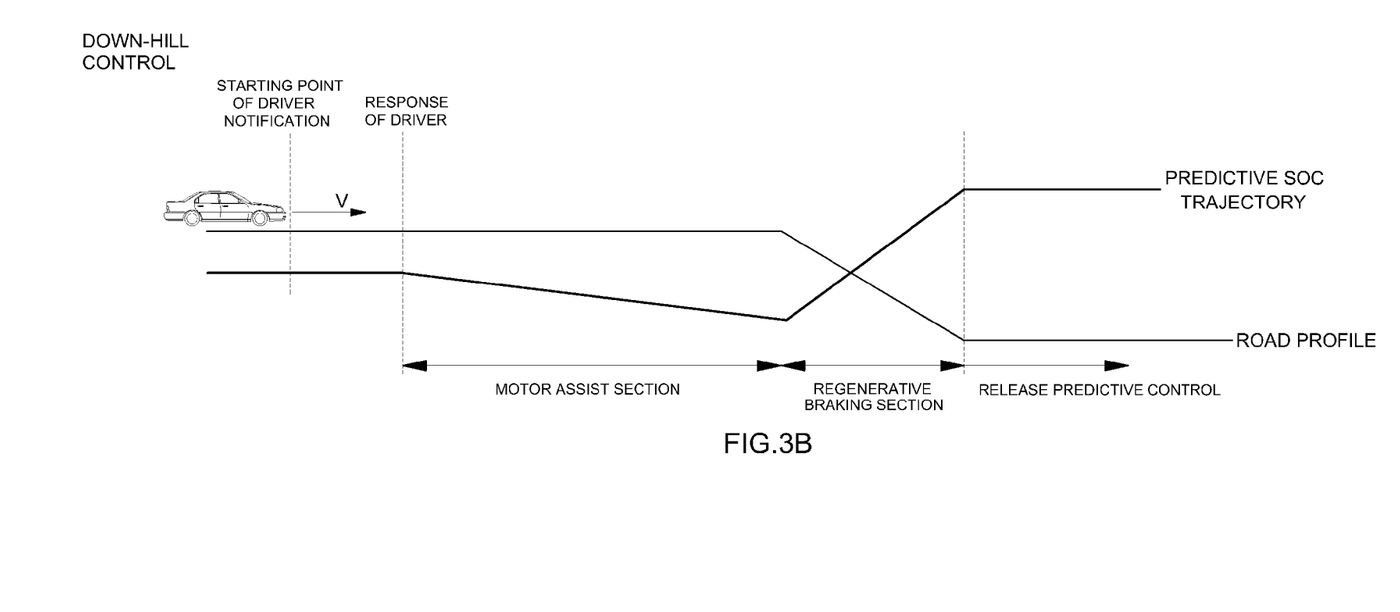

In contrast, as illustrated in FIG. 3B, when the downhill driving is performed after receiving a feedback of the intended driving direction of the driver, a battery SOC amount when the vehicle passes a straight line course immediately before the downhill drive and passes through the downhill driving course is calculated to set a reference SOC trajectory, and the battery is charged and discharged in the set range. In this case, motor assist driving is performed by discharging the battery in the straight line course immediately before the downhill drive and the battery is charged by a regenerative braking system in the downhill driving course.

Therefore, when there is a long downhill road ahead, the motor assist driving is performed by discharging the battery immediately before the downhill driving course and then the battery is charged by the regenerative braking system so that it is possible to prevent electric energy which is obtained by the regenerative braking system from being wasted due to early fully-charged battery.

In the meantime, according to the exemplary embodiment of the present invention, when the vehicle is driven in a driving mode (HEV driving mode) in accordance with the engine driving and motor assist, as a step of compensating an engine torque to follow the reference SOC trajectory, a step of determining an engine driving point in accordance with a current battery SOC and a step of calculating an engine compensating torque to adjust an engine driving point by adding a compensating torque in accordance with the reference SOC trajectory to an engine output torque which is output in accordance with the determined engine driving point are further performed.

In this case, when the engine compensating torque to follow the reference SOC trajectory is calculated, a required engine torque and an output torque of an engine driving point determining unit are considered.

For example, when the vehicle enters a downhill road, a motor assist driving is not performed in a state where a charged amount which is obtained by a regenerative braking system is calculated to predict the reference SOC trajectory so that a positive compensating torque is added to adjust the engine driving point and in contrast, when the vehicle enters an uphill road, the battery discharge is performed to perform the motor assist driving in a state where the reference SOC trajectory is set so that a negative compensating torque is added to adjust the engine driving point.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A device for controlling a battery State of Charge (SOC) of a hybrid vehicle, comprising:
   a navigation system which provides a driving route and gradient information within a predetermined distance ahead;
   a controlling determining unit which determines whether it is required to control the battery SOC based on the information provided from the navigation system, a vehicle speed, and SOC information;
   a user interface which receives a feedback of a driving direction from a driver when it is determined that it is required to control the battery SOC; and
   a charging/discharging scheduler unit which sets a reference SOC trajectory by calculating an SOC amount based on the driving path and the gradient information within the predetermined distance ahead and charges or discharges the battery within the set reference SOC trajectory, when the feedback of the driving direction from the driver is received,
   wherein the controlling determining unit outputs a flag for controlling the battery SOC after receiving the feedback of the driving route from the driver when there is a crossroad in the driving route within the predetermined distance ahead.

2. The device of claim 1, further comprising:
   an engine driving point determining unit which determines an engine driving point in accordance with a current battery SOC; and
   an engine compensating torque calculating unit which adds a compensating torque in accordance with the reference SOC trajectory to an engine output torque which is output from the engine driving point driving unit to adjust an engine driving point.

3. The device of claim 1, wherein the user interface comprises:
   a notifying unit which notifies the driver that the SOC needs to be controlled in accordance with a road gradient ahead; and
   a feedback input unit which inputs an intended driving direction of the driver.

4. The device of claim 3, wherein the notifying unit employs one or more of an instrument cluster, a navigation system, and a head-up display.

5. The device of claim 3, wherein the feedback input unit employs one or more of a soft button on the navigation system, a button on a steering wheel, a paddle shift, and a voice command recognizing unit.

6. A method of controlling a battery SOC of a hybrid vehicle, comprising:
   a controlling determining step of determining whether it is required to control charging or discharging of a battery for every battery SOC based on a driving route and gradient information within a predetermined distance ahead and a vehicle speed, and SOC information;
   a user interface executing step of receiving a feedback of a driving direction from a driver when it is determined that it is required to control the charging or discharging of the battery;
   a charging or discharging scheduling step of setting a reference SOC trajectory by calculating an SOC amount based on the driving route and the gradient information within a predetermined distance ahead when the feedback of the driving direction from the driver is received and controlling to charge or discharge the battery within the set reference SOC trajectory; and
   outputting a flag for controlling the battery SOC for the charging or discharging scheduling when it is determined to satisfy the condition that the calculated predictive required power or an average gradient value is equal to or larger than or equal to or smaller than a predetermined limit and the current battery SOC is maintained in a predetermined band,
   wherein when there is a crossroad in the driving route within the predetermined distance ahead, the flag for controlling the battery SOC is output after receiving the feedback of the driving route from the driver.

7. The method of claim 6, wherein the controlling determining step comprises:
   calculating predictive required power of a vehicle in accordance with the driving route and the gradient condition within the predetermined distance ahead under a predetermined vehicle speed condition.

8. The method of claim 6, wherein when the current SOC of the battery is out of a predetermined band or the vehicle speed is lowered below a predetermined vehicle speed, the controlling determining step is released.

9. The method of claim 6, wherein the user interface executing step comprises:
   notifying to the driver that the SOC needs to be controlled in accordance with a road gradient ahead; and
   directly inputting an intended driving direction of the driver through a feedback input unit by the driver.

10. The method of claim 6, further comprising:
    a step of determining an engine driving point in accordance with a current battery SOC; and
    an engine compensating torque calculating step of adjusting the engine driving point by adding a compensating torque in accordance with the reference SOC trajectory to an engine output torque which is output in accordance with the determined engine driving point.

11. A non-transitory computer readable medium containing program instructions executed by a controller, the computer readable medium comprising:
- program instructions that determine whether it is required to control charging or discharging of a battery of a hybrid vehicle for every battery SOC based on a driving route and gradient information within a predetermined distance ahead and a vehicle speed, and SOC information;
- program instructions that receive a feedback of a driving direction from a driver when it is determined that it is required to control the charging or discharging of the battery;
- program instructions that set a reference SOC trajectory by calculating an SOC amount based on the driving route and the gradient information within a predetermined distance ahead when the feedback of the driving direction from the driver is received and controlling to charge or discharge the battery within the set reference SOC trajectory; and
- program instructions that output a flag for controlling the battery SOC for the charging or discharging scheduling when it is determined to satisfy the condition that the calculated predictive required power or an average gradient value is equal to or larger than or equal to or smaller than a predetermined limit and the current battery SOC is maintained in a predetermined band,
- wherein when there is a crossroad in the driving route within the predetermined distance ahead, the flag for controlling the battery SOC is output after receiving the feedback of the driving route from the driver.

* * * * *